Nov. 4, 1930.   C. C. SPREEN   1,780,249
JOURNAL BEARING SEAL
Filed Dec. 30, 1926
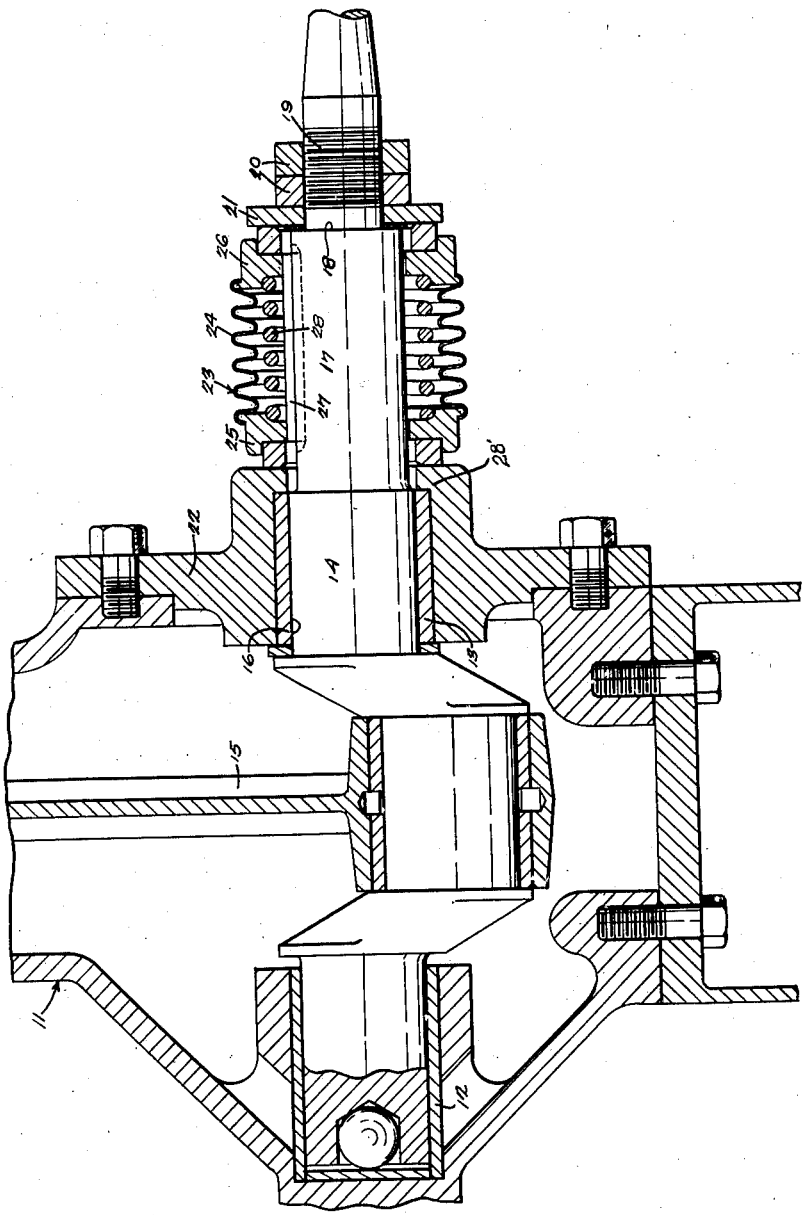
Charles C. Spreen
    Inventor
by Smith and Freeman
    Attorneys Patented Nov. 4, 1930

1,780,249

UNITED STATES PATENT OFFICE

CHARLES C. SPREEN, OF DETROIT, MICHIGAN

JOURNAL-BEARING SEAL

Application filed December 30, 1926. Serial No. 157,941.

My invention relates to journal bearing seals, and particularly to means for sealing the drive shaft aperture in the casing of a refrigerant compressor, and the principal object of my invention is to provide new and improved means for this purpose. In the drawings accompanying this specification and forming a part of this application I have shown, for purposes of illustration, one form which my invention may assume, and in these drawings the single figure is a fragmentary central vertical section through a compressor showing the embodiment of my invention herein disclosed.

In the embodiment of my invention herein shown the lower portion of the compressor casing 11 is provided with a closed bearing 12 and an open-end bearing 13 arranged to jointly support a crank shaft 14 which receives between the bearings 12 and 13 the usual connecting rod 15. The shaft projects beyond the open-end bearing 13 through a suitable aperture 16 in the casing 11, and is provided exteriorly of the casing 11 with a reduced extension 17 forming an annular shoulder 18, provided with a screw-threaded portion 19 arranged to receive nuts 20 holding a flange 21 firmly sealed to the shoulder 18. The extension is adapted to receive a suitable driving connection, not shown; and the casing 11 is provided with an annular casing seat 28' surrounding the aperture 16 and the crank shaft 14 passing therethrough.

Closing the aperture 16, particularly to prevent the egress of refrigerant and the ingress of moisture, is a seal 23 comprising a substantially tubular flexible bellows 24 corrugated to increase its flexibility, having its inner end secured to an annular member 25 adapted to be held in sealing engagement with the casing seat 28', and having its outer end secured to an annular member 26 adapted to be held in sealing engagement with the flange 21, a key 27 holding the bases 25 and 26 for rotation with the shaft 14, and a compression spring 28 interposed between the bases 25 and 26 serving to hold the annular members 25 and 26 in sealing engagement respectively with the casing seat 28' and the flange 21.

From the above description it will be obvious to those skilled in the art that I have provided a seal readily removable as a unit merely by removing the securing nuts 20, but serving to tightly and securely seal the aperture 16, and under these circumstances it will be apparent to those skilled in the art that the embodiment of my invention herein shown accomplishes at least the principal object of my invention.

At the same time, it will also be obvious to those skilled in the art that the embodiment of my invention herein shown and described may be variously changed and modified without departing from the spirit of my invention or sacrificing the advantages thereof, and it will therefore be understood that the disclosure herein is illustrative only, and that my invention is not limited thereto.

I claim:

1. In combination with a casing provided with a shaft aperture, a plate for closing said casing aperture provided with a bearing aperture and an exterior seat and a shaft extending through said apertures; of a seal structure including a tubular bellows, annular members secured to each end of the bellows, said members being keyed to and movable longitudinally of said shaft, friction rings attached to said annular members, a seating plate clamped to a shoulder of said shaft and a spring within said bellows for rotatably and resiliently sealing said annular members to said plate seats.

2. In combination with a casing provided with a shaft aperture, a plate for closing said casing aperture provided with a bearing aperture, and an exterior seat and a shaft extending through said apertures; of a seal structure associated with said shaft including a tubular bellows, annular members secured to each end of said bellows and keyed to said shaft, a seating plate clamped to a shoulder of said shaft and means for rotatably and resiliently sealing said annular members to said seats.

3. In combination with a casing provided with a shaft aperture, a plate for closing said casing aperture provided with a bearing aperture and an exterior seat and a shaft extending through said apertures; of a seal structure including a tubular bellows, annular members secured to each end of said bellows, a key fixing said annular members to rotate directly with said shaft, a plate clamped to a shoulder of said shaft and a spring within said bellows for pressing said annular members against said plates.

In testimony whereof I hereunto affix my signature.

CHARLES C. SPREEN.